United States Patent
Balun et al.

(10) Patent No.: US 10,415,124 B2
(45) Date of Patent: Sep. 17, 2019

(54) CHASSIS OR DRIVE COMPONENT

(71) Applicant: Benteler Steel/Tube GmbH, Paderborn (DE)

(72) Inventors: Jozef Balun, Paderborn (DE); Thomas Fortmeier, Delbrück (DE); Martin Junker, Verl (DE); Sandor Schumann, Delbrück (DE)

(73) Assignee: Benteler Steel/Tube GmbH (DE)

( * ) Notice: Subject to any disclaimer, the term of this patent is extended or adjusted under 35 U.S.C. 154(b) by 356 days.

(21) Appl. No.: 15/205,667

(22) Filed: Jul. 8, 2016

(65) Prior Publication Data

US 2017/0009321 A1 Jan. 12, 2017

(30) Foreign Application Priority Data

Jul. 9, 2015 (DE) .................. 10 2015 111 150

(51) Int. Cl.
*C22C 38/38* (2006.01)
*C22C 38/32* (2006.01)
(Continued)

(52) U.S. Cl.
CPC .............. *C22C 38/38* (2013.01); *B60K 17/22* (2013.01); *C22C 38/02* (2013.01); *C22C 38/22* (2013.01);
(Continued)

(58) Field of Classification Search
CPC ........ B62D 29/00; B62D 55/116; B62D 7/00; B62D 21/15; B60K 17/00; B60K 17/22; C22C 33/00; C22C 33/04; C22C 38/00; C22C 38/02; C22C 38/04; C22C 38/12; C22C 38/14; C22C 38/18; C22C 38/22; C22C 38/24; C22C 38/28; C22C 38/32; C22C 38/38; C21D 1/00; C21D 6/00; C21D 6/002; C21D 6/005; C21D 6/008; C21D 6/02; C21D 8/00; C21D 8/005;
(Continued)

(56) References Cited

U.S. PATENT DOCUMENTS

2011/0008648 A1* 1/2011 Okitsu ................. B23K 9/23
428/683

FOREIGN PATENT DOCUMENTS

DE   10 2006 016 099 B4   10/2007
DE   10 2008 048 389 A1   6/2010
(Continued)

OTHER PUBLICATIONS

Machine Translation JP 2001-181781. J-Plat Pat. (Year: 2018).*
Machine Translation JP 2004-083979. J-Plat Pat. (Year: 2018).*

*Primary Examiner* — Alexandra M Moore
(74) *Attorney, Agent, or Firm* — Pandiscio & Pandiscio

(57) ABSTRACT

The present invention relates to a, comprising a tubular element (10) with at least one heat-affected zone (14), characterized by a yield strength $Rp_{0.2}$ in the heat-affected zone (14) of at least 640 MPa and a tensile strength Rm in the heat-affected zone of at least 850 MPa and by at least the tubular element (10) consisting of a steel alloy consisting, in weight percent:

| | |
|---|---|
| C | 0.12-0.22% |
| Mn | 1.5-2.5% |
| Si | 0.45-0.85% |
| Cr | <1.5% |
| V | ≥0.04% |
| B | 0.0010-0.0040% |
| Ti | 0.02-0.1% und |
| optionally Mo | ≤0.6%, | balance iron and impurities resulting from smelting.

14 Claims, 4 Drawing Sheets

(51) Int. Cl.
  *C22C 38/28*    (2006.01)
  *C22C 38/24*    (2006.01)
  *C22C 38/22*    (2006.01)
  *C22C 38/02*    (2006.01)
  *B60K 17/22*    (2006.01)

(52) U.S. Cl.
  CPC .............. *C22C 38/24* (2013.01); *C22C 38/28* (2013.01); *C22C 38/32* (2013.01); *C21D 2211/002* (2013.01); *C21D 2211/008* (2013.01)

(58) Field of Classification Search
  CPC . C21D 8/10; C21D 8/105; C21D 9/00; C21D 9/08; C21D 9/30; C21D 9/28; C21D 9/38; C21D 2211/00; C21D 2211/002; C21D 2211/004; C21D 2211/008; C21D 2221/00; C21D 2221/01; C21D 2221/02; C21D 2221/10
  See application file for complete search history.

(56)        References Cited

FOREIGN PATENT DOCUMENTS

| | | |
|---|---|---|
| DE | 10 2013 101 276 A1 | 8/2014 |
| EP | 1264910 | 12/2002 |
| EP | 1375683 | 1/2004 |
| EP | 2765014 B1 | 8/2014 |
| JP | 2001181781 A * | 7/2001 |
| JP | 2004083979 A * | 3/2004 |
| WO | WO 2013/144376 | 10/2013 |

\* cited by examiner

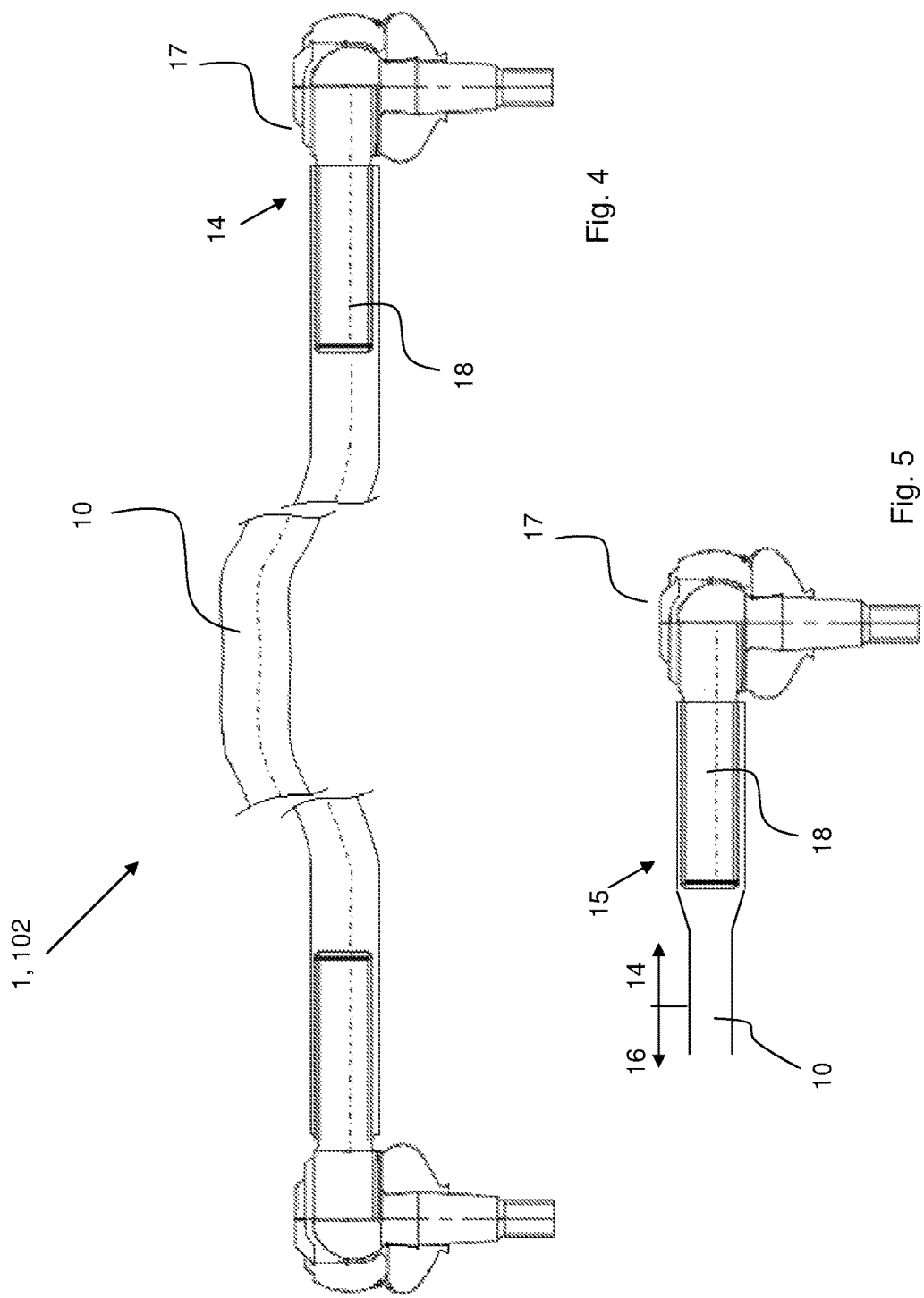

CHASSIS OR DRIVE COMPONENT

REFERENCE TO PENDING PRIOR PATENT APPLICATION

This patent application claims benefit of German Patent Application No. 10 2015 111 150.0 filed Jul. 9, 2015, which patent application is hereby incorporated herein by reference.

FIELD OF THE INVENTION

The present invention relates to a chassis component or drive component for a motor vehicle.

BACKGROUND OF THE INVENTION

Components of a motor vehicle, in particular chassis components and drive components are subject to different requirements which depend on their location of utilization and function in the motor vehicle. In addition, components of motor vehicles are usually finished by machining processes which are at least partially of thermal nature. For example, components of motor vehicles are usually subjected to thermal forming operation and/or are connected to further connecting components by means of thermal joining operations, such as welding.

In particular in the area of thermal stress, which is also referred to as heat-affected zone, tempering of the material of the component may occur for example and the properties of the component are therefore adversely influenced in this area.

An object of the present invention is therefore to provide a solution, by means of which a component, in particular a chassis component or drive component of a motor vehicle can be provided, which—at least with respect to the mechanical characteristics—is such that it can withstand the loads in the motor vehicle. In addition, preferably the disadvantages of the prior art are to be reduced by the solution and at the same time additional requirements for the component, such as weldability, ability to be galvanized and high strength are to be taken into account.

SUMMARY OF THE INVENTION

The invention is based on the finding that this object may be achieved by setting mechanical characteristics at least in the heat-affected zone such that the vehicle component can withstand the load in the motor vehicle.

According to the invention a steel alloy is used for at least the tubular element of the chassis or drive components of a motor vehicle, consisting of, in weight percent:

| | |
|---|---|
| C | 0.12-0.22% |
| Mn | 1.5-2.5% |
| Si | 0.45-0.85% |
| Cr | <1.5% |
| V | ≥0.04% |
| B | 0.0010-0.0040% |
| Ti | 0.02-0.1% und |
| optionally Mo | ≤0.6%, | balance iron and impurities resulting from smelting.

This steel alloy, which will hereinafter also be referred to as material or alloy, is a temper-resistant alloy. Thus a decrease in hardness can be minimized even during thermal processing steps. Moreover, the material used according to the invention is an air-hardening material. Furthermore, even after thermal treatment of the vehicle component, which is manufactured from this material, properties are present which account for the loads on the vehicle component in the motor vehicle. In particular high yield strength and high tensile strength can be achieved.

In the alloy, which is used according to the invention, hardening of the material is assured by carbon being present in the claimed range between 0.12 and 0.22 wt %. If the carbon content is too low, that is if it is in particular below 0.12 wt %, the strength of the alloy is too low. If, to the contrary, the carbon content is too high, that is if it is above 0.22 wt %, the weldability of the material and thus of the component, which is manufactured from the material, is impaired. Due to the carbon content which is present according to the invention, a strength of the material can be achieved, where addition of expensive alloying elements, such as for example molybdenum for strength increase, can be omitted or at least already small amounts of these alloying elements can be sufficient.

Manganese according to the invention is contained in the alloy in an amount of 1.5-2.5 wt %. By adding manganese, the through-hardening ability of the material is increased and thereby an increase of strength is achieved. By adding manganese in the indicated amount, air-hardening properties of the material will be achieved. Furthermore, manganese contributes to the increase of strength by solid solution strengthening.

Chromium according to the invention is present in amounts in the range of up to 1.5 wt %, preferably in the range of 0.5 to 1.5 wt %. Thereby on the one hand, the increase of the through-hardening ability of the material and thereby an increase of the strength is achieved. On the other hand, air-hardening properties are achieved by addition of chromium in the indicated amount. The amount of chromium according to the invention is limited to maximum 1.5 wt %. If the chromium content is higher, precipitation of chromium carbides can occur which leads to a deterioration of the weldability.

According to the present invention, silicon is present in an amount of 0.45-0.85 wt %. By adding silicon in this range, an increase of the strength by solid solution strengthening occurs in the alloy according to the invention. Furthermore, silicon also increases the through-hardening ability of the material and thereby increase in strength is achieved. The effect of silicon in this respect, however, is weaker than the effect of chromium or manganese. Therefore, according to the invention at least 0.45 wt % silicon are contained in the alloy. If the silicon content is too high, the occurrence of segregations is increased and therewith the risk of cracks during the hardening or cold working. The silicon content in the inventive alloy is therefore maximum 0.85 wt %. Even though it has to be anticipated that with a higher silicon content the temper-resistance of the material decreases, the inventors have found, that, with the other alloying elements which are contained in the inventive alloy even with silicon contents up to 0.85 wt % a sufficient temper-resistance can be assured.

According to the invention vanadium is present in amounts of at least 0.04 wt %. In a preferred embodiment, the vanadium content is in the range of 0.004-0.15 wt %. Since vanadium is added in these amounts, the temper-resistance which is intended according to the invention can be ensured. In addition, a deterioration of the mechanical characteristics, in particular strength and forming characteristics, after thermal stress can be reduced due to generation of vanadium carbon nitrides. Furthermore, the air hardenability of the alloy is supported by targeted addition of vanadium. By limiting the vanadium content to a maximum of 0.15 wt % the costs of the alloy can be limited, while the advantages of the addition of vanadium are still achieved.

According to the invention boron is contained in a range of 0.0010-0.0040 wt % in the alloy. Thereby the increase in through-hardenability of the material is further increased. Titanium is contained in an amount in the range of 0.02-0.1 wt %. Since titanium is added, any nitrogen which may be present in the alloy may be bound. The nitrogen for example may be present in the alloy in case of dispensation of a vacuum degassing. Thereby the formation of boron nitrides is avoided and the effect of boron, in particular the hardness increasing effect, can be used. If less than 0.02 wt % titanium is present in the alloy or if no titanium is present, boron nitrides would form and thereby the hardness increasing effect of boron could not be used any more.

Molybdenum is contained optionally. If molybdenum is added, the molybdenum content in the alloy is preferably not higher than 0.6%. If molybdenum is added, the through-hardening of the material can be further increased and thereby also the increase of strength can be improved. Furthermore, molybdenum, like vanadium, can improve the temper-resistance. Finally, molybdenum effects a reduction of the tendency of embrittlement during the thermal stress, which may also be referred to as tempering embrittlement. If molybdenum is present in the alloy, the molybdenum content is preferably within the range of 0.1-0.2 wt %.

With the alloy used in the invention, thus, a temper-resistant material is provided, which in addition ensures the hardening of the material, an increased strength and which nevertheless can be welded. Furthermore, the material has an increased through-hardenability, whereby the strength is further increased. In addition, the inventive alloy has air-hardening properties and the embrittlement tendency is reduced. Furthermore, heat-treatment may be omitted in the final manufacture step of the vehicle component, that is at the customer's premises. Finally, the alloy used in the invention has a high temperature-resistance. Due to the small amounts of chromium and vanadium as well as molybdenum optionally in the inventive alloy, also the costs are reduced.

In one embodiment of the alloy used in the invention, the carbon content is between 0.15 and 0.2 wt %. In this range the above mentioned effects of the carbon can be utilized particularly well or its negative influences are limited, respectively.

According to a preferred embodiment, the steel alloy consists of, indicated in weight percent:

| | |
|---|---|
| C | 0.18% |
| Mn | 2.1% |
| Si | 0.6% |
| Cr | 0.6-1.4% |
| V | 0.07% |
| B | 0.0020% |
| Ti | 0.05% |
| Mo | 0.1-0.2% | balance iron and impurities resulting from smelting.

The following steel alloys have proven to be especially suitable:

Alloy 1:

| | |
|---|---|
| C | 0.18% |
| Mn | 2.1% |
| Si | 0.6% |
| Cr | 1.4% |
| V | 0.07% |
| B | 0.0020% |
| Ti | 0.05% |
| Mo | 0.2% | balance iron and impurities resulting from smelting.

Alloy 2:

| | |
|---|---|
| C | 0.18% |
| Mn | 2.1% |
| Si | 0.6% |
| Cr | 0.6% |
| V | 0.07% |
| B | 0.0020% |
| Ti | 0.05% |
| Mo | 0.2% | balance iron and impurities resulting from smelting.

Alloy 3:

| | |
|---|---|
| C | 0.18% |
| Mn | 2.1% |
| Si | 0.6% |
| Cr | 0.6% |
| V | 0.07% |
| B | 0.0020% |
| Ti | 0.05% |
| Mo | 0.1% | balance iron and impurities resulting from smelting.

In the following tables, the results of tensile tests are indicated with specimen in the air-hardened and subsequently tempered condition of these three alloys. Therein the specimen were tempered for the duration of 5 minutes at 600° C. or 700° C., respectively.

TABLE 1

Alloy 1

| Specimen | Temp. ° C. | $D_O$ mm | $D_U$ mm | $L_O$ mm | $L_U$ mm | $RP_{0.2}$ mm | $R_m$ Mm | $A_g$ % | A % | Z % | Tempering temp. ° C. |
|---|---|---|---|---|---|---|---|---|---|---|---|
| A5 | 20 | 5.99 | 4.20 | 30.00 | 34.94 | 837.5 | 1144.5 | 7.2 | 16.5 | 50.8 | 600 |
| A6 | 20 | 5.97 | 4.16 | 30.00 | 35.24 | 836.3 | 1144.1 | 7.6 | 17.5 | 51.4 | |
| A8 | 20 | 5.99 | 4.18 | 30.00 | 35.30 | 841.4 | 1144.1 | 7.1 | 17.7 | 51.3 | |
| Average | | | | | | 838.4 | 1145.3 | 7.3 | 17.2 | 51.2 | |
| A9 | 20 | 5.98 | 3.86 | 30.00 | 34.82 | 722.1 | 940.0 | 6.4 | 16.1 | 58.3 | 700 |
| A10 | 20 | 6.00 | 3.85 | 30.00 | 34.90 | 721.5 | 939.2 | 6.8 | 16.3 | 58.8 | |
| A11 | 20 | 6.00 | 3.86 | 30.00 | 36.39 | 730.8 | 946.7 | 7.4 | 21.3 | 58.6 | |
| Average | | | | | | 724.8 | 942.0 | 6.9 | 17.9 | 58.6 | |

TABLE 2

Alloy 2

| Specimen | Temp. ° C. | $D_O$ mm | $D_U$ mm | $L_O$ mm | $L_U$ mm | $RP_{0.2}$ mm | $R_m$ Mm | $A_g$ % | A % | Z % | Tempering temp. ° C. |
|---|---|---|---|---|---|---|---|---|---|---|---|
| B5 | 20 | 5.97 | 4.09 | 30.00 | 34.76 | 703.1 | 977.3 | 6.9 | 15.9 | 53.1 | 600 |
| B6 | 20 | 5.98 | 4.20 | 30.00 | 35.45 | 692.0 | 978.2 | 7.0 | 14.8 | 50.7 | |
| B8 | 20 | 5.99 | 4.21 | 30.00 | 35.73 | 692.4 | 972.7 | 7.1 | 15.8 | 50.6 | |
| Average | | | | | | 695.8 | 976.0 | 7.0 | 15.5 | 51.4 | |
| B9 | 20 | 5.99 | 4.05 | 30.00 | 34.45 | 661.1 | 913.4 | 7.9 | 14.8 | 54.3 | 700 |
| B10 | 20 | 6.00 | 4.10 | 30.00 | 35.69 | 668.4 | 917.7 | 7.8 | 19.0 | 53.3 | |
| B11 | 20 | 6.00 | 4.03 | 30.00 | 35.38 | 666.8 | 919.7 | 7.9 | 17.9 | 54.9 | |
| Average | | | | | | 665.4 | 916.9 | 7.9 | 17.2 | 54.2 | |

TABLE 3

Alloy 3

| Specimen | Temp. ° C. | $D_O$ mm | $D_U$ mm | $L_O$ mm | $L_U$ mm | $RP_{0.2}$ mm | $R_m$ Mm | $A_g$ % | A % | Z % | Tempering temp. ° C. |
|---|---|---|---|---|---|---|---|---|---|---|---|
| C5 | 20 | 5.98 | 4.09 | 30.00 | 34.20 | 684.9 | 911.3 | 6.8 | 14.0 | 53.2 | 600 |
| C6 | 20 | 5.97 | 4.05 | 30.00 | 33.43 | 695.2 | 920.5 | 6.7 | 11.4 | 54.0 | |
| C8 | 20 | 5.97 | 4.02 | 30.00 | 34.94 | 692.6 | 921.3 | 7.1 | 16.5 | 54.7 | |
| Average | | | | | | 690.9 | 917.7 | 6.9 | 14.0 | 54.0 | |
| C9 | 20 | 5.99 | 4.00 | 30.00 | 34.93 | 648.1 | 867.2 | 8.1 | 16.4 | 55.4 | 700 |
| C10 | 20 | 5.99 | 3.96 | 30.00 | 35.45 | 647.0 | 874.3 | 7.9 | 18.2 | 56.3 | |
| C11 | 20 | 5.99 | 4.04 | 30.00 | 35.65 | 651.1 | 880.6 | 7.7 | 18.8 | 54.5 | |
| Average | | | | | | 648.8 | 874.1 | 7.9 | 17.8 | 55.4 | |

As can be derived from these tables, even at a tempering temperature of 700° C. the yield strength $Rp_{0.2}$ is still very high and is more than 640 MPa. Also the tensile strength $R_m$ is very high at tempering temperatures of 700° C. and is higher than 850 MPa, in particular higher than 900 MPa.

The invention relates to a vehicle component, preferably to a torsion component, that is to a component which is at least temporarily subjected to torsional moments when it is used. The vehicle component can in particular be a chassis component or drive component of a motor vehicle.

The vehicle component according to the present invention comprises a tubular element with at least one heat-affected zone. The vehicle component is characterized in that in the heat-affected zone it has a yield strength $Rp_{0.2}$ of at least 640 MPa and a tensile strength Rm in the heat-affected zone of at least 850 MPa, in particular 900 MPa. The mechanical characteristics, namely yield strength and tensile strength preferably are within the claimed range in the normalized and air-hardened condition of the material with subsequent heat-treatment or tempering, respectively.

The heat-affected zone can be generated at the tubular element as a result of a thermal joining operation and/or a thermal forming operation. The thermal joining operation may for example be welding. Herein, the heat-affected zone adjoins to the welding seam. The tubular element may for example be attached to a connecting component by means of the welding seam.

Since the tubular element has high yield strength and high tensile strength in the heat affected zone, a failure of the vehicle component in the area of the heat-affected zone can be prevented. In particular, also dynamic loads on the heat-affected zone can be withstood. In addition, the vehicle component and in particular the tubular element can be manufactured with smaller wall thickness, whereby a weight reduction is possible without reducing the load-bearing capacity of the vehicle component.

Preferably, the at least one heat-affected zone at the tubular element of the chassis or drive component has a tempered structure of tempered bainite and/or tempered martensite. With this structure, the mechanical characteristics according to the invention, namely the yield strength and the tensile strength can be achieved, while the vehicle component still has a sufficient hardness. This structure according to the invention is formed by the thermal treatment, due to which the heat-affected zone forms. Preferably, the tubular element of the chassis or drive component is manufactured from a seamless pipe or a welded pipe.

The vehicle component, in particular the chassis component, according to one embodiment is a chassis element, in particular a stabilizer or a track rod. Alternatively, the component according to the invention may be a drive component, in particular a drive shaft.

With these kinds of vehicle components, the present invention may be used particularly advantageously.

A stabilizer generally comprises a tubular element, which is connected to a connecting element, in particular a torque lever, at each of its longitudinal ends. For this purpose the tubular element, which can also be referred to as torsional tube or stabilizer tube, can be welded to the connecting elements. In addition, the tubular element of a stabilizer is generally designed such, that it is transformed at its longitudinal ends, for example is widened. This forming is preferably carried out as hot working. Thereby at a stabilizer, a heat-affected zone is present at the respective two longitudinal ends of the tubular element.

As the tubular element according to the invention has a relatively high yield strength and high tensile strength in the heat-affected zone, a failure of the stabilizer can be prevented even under load on these zones when utilizing the stabilizer in a motor vehicle.

A track rod, which can also be referred to as tie rod, is in particular a connecting rod which is used in a rigid axle of a vehicle. The track rod may be used with joints and steering arms at the axle sides of a vehicle. The wheels of a vehicle are normally supported on steering knuckles. The steering knuckles may be connected rigidly to the rigid axle of a vehicle. In case of independent suspension the wheels may be connected via so called axle guides to the chassis of the vehicle. For axles which are steered the connection to the chassis generally is established via a track rod.

With a drive shaft, the tubular element is a hollow shaft. Generally, a part of a joint is formed at the wheel-sided end and at the gearbox-sided end of the tubular element, respectively. For this purpose, connecting elements, such as a toothed shaft end, are mounted at the ends of the hollow shaft, that is the tubular element. The shaft end is herein preferably welded to the tubular element. Thereby, a heat-affected zone is formed at the tubular element at the connection point between shaft end and hollow shaft. Due to the mechanical characteristics which are set in the heat-affected zone, with the drive shaft according to the invention a failure of the drive shaft in the heat-affected zone can be prevented even under load.

According to a preferred embodiment, the tubular element comprises besides the at least one heat-affected zone a further length section, wherein the further length section has a normalized or air-hardened structure, wherein the further length section has a tensile strength Rm of >1,050 MPa. With the tensile strength being even higher in the further length section than the tensile strength in the heat-affected zone(s), the vehicle component can better withstand load. As the further length section has this high tensile strength in the normalized or air-hardened condition, a further heat treatment of the further length section can be omitted.

According to a further embodiment, the tubular element has a length, wherein the heat-affected zone has a length, which is less than 15 percent, in particular less than 10 percent of the length of the tubular element.

However, according to the present invention it is also possible, that the tubular element has a length and the heat-affected zone of the tubular element extends over the entire length of the drive component or chassis component. This is possible in the present invention, as the tensile strength and the yield strength, which the material has in the heat-affected zone, are relatively high.

According to an embodiment, it is also possible that the chassis component or drive component is completely tempered. In this case, also the connecting components have been subjected to a temperature increase and after holding at the tempering temperature have been cooled.

According to an embodiment, the tubular element has two opposite ends, which have a widened, upset or reduced cross section in comparison to the further length section. The ends of the tubular element which have been modified in their cross section are within the heat-affected zone. The ends, which have a modified cross section, may serve as support for the connection with the connecting components. For example, the connecting length between the tubular element and a planar connecting element, for example a torque lever, can be increased by widened ends.

According to an embodiment in particular the ends of the tubular element are hot-formed. By means of hot-forming the intended shape of the ends of the tubular element may be manufactured in a simple manner.

The heat-affected zone may be generated by subjecting at least the ends of the tubular element to a temperature of 600° C. for at least 5 minutes, preferably for at least 15 minutes.

According to the invention, at least the tubular element of the chassis or drive component is made of an alloy according the claims. The advantages, which have been described with respect to the alloy, can be used particularly advantageous with a tubular element of a chassis component or drive component of a motor vehicle. In particular, the mechanical characteristics can be set and the tubular element can be mounted in the normalized or air-hardened condition in the vehicle component, for example be welded thereto. Thereby the manufacturing of the vehicle component is simplified, wherein nevertheless sufficient strength values are achieved even in the heat-affected zone, which may be formed for example by welding.

According to an embodiment, the heat-affected zone has a metallic coating at an outer surface and/or an inner surface of the drive component or chassis component. This coating may be for example a zinc layer.

Advantages and features, which are described with respect to the alloy—as far as applicable—also apply to the vehicle component and vice versa and may only be mentioned in the context of the alloy or the vehicle component.

BRIEF DESCRIPTION OF THE DRAWINGS

The present invention will now be described again with reference to the attached drawings. Herein:

FIG. 4 shows a schematic view of a third embodiment of the chassis component according to the invention; and FIG. 5 shows a schematic detailed view of one longitudinal end of a forth embodiment of the chassis component.

DETAILED DESCRIPTION OF THE INVENTION

Figure 1:
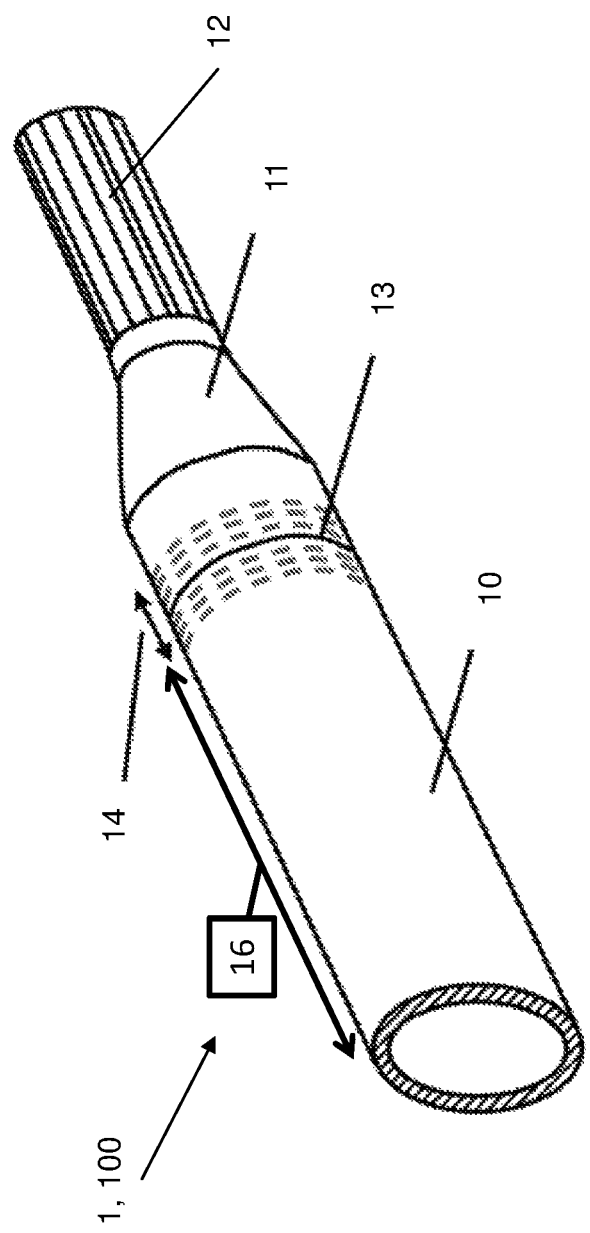
FIG. 1 shows a schematic perspective view of a first embodiment of a drive component according to the invention.

A perspective view of an end of a first embodiment of the drive component 1 of the invention is shown in FIG. 1. In the depicted embodiment the drive component 1 is a drive shaft 100, which may also be referred to as joint shaft. In the end which is depicted in FIG. 1, the drive shaft 100 consists of a tubular element 10 in at least a part of its length. At one end of the tubular element 10 a toothed shaft end 12 is welded thereto. In the depicted embodiment, the toothed shaft end 12 is connected via a tapered area 11 to a rod area or tubular area, which has a diameter which corresponds to the diameter of the tubular element 10. The tubular element 10 is welded together with the shaft end 12 via a welding seam. In the area of the welding seam 13 the heat-affected zone 14 which is formed by the welding is indicated schematically. At the heat-affected zone 14 a further length section 16 is adjacent, which is present in the normalized or air-hardened condition.

Figure 2:
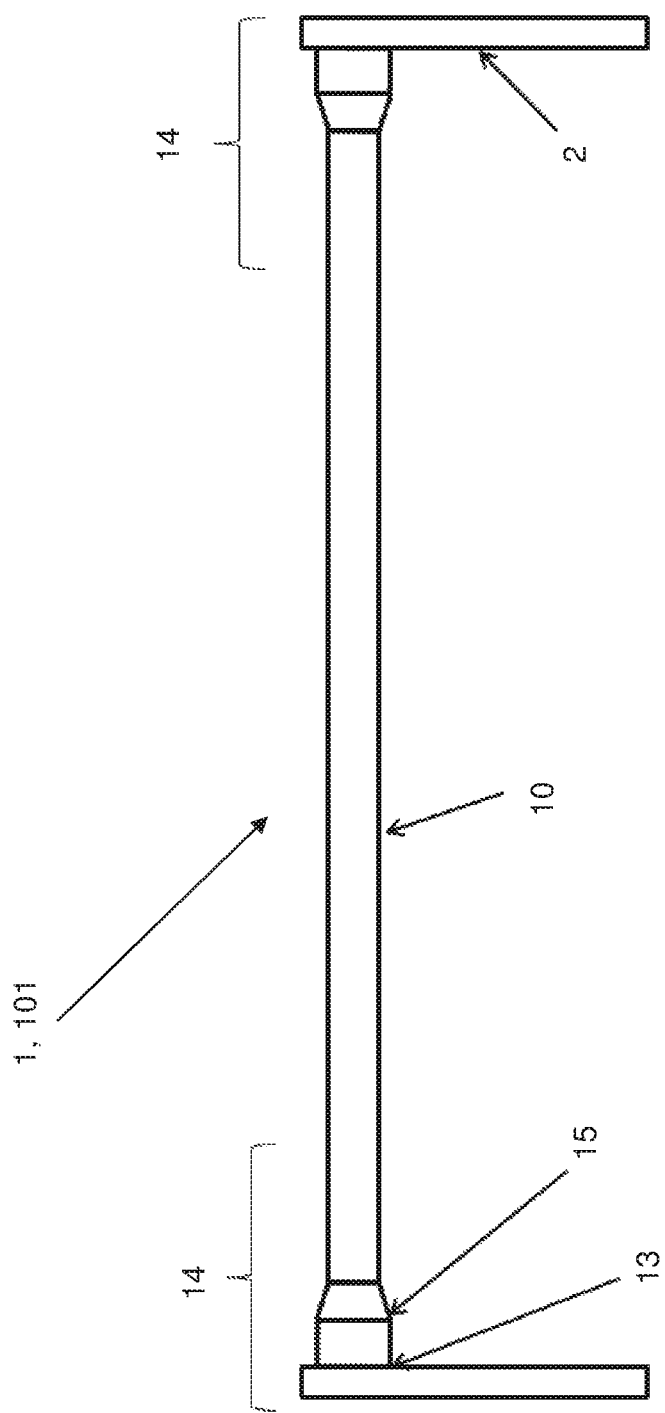
FIG. 2 shows a schematic view of a second embodiment of the chassis component according to the invention.
Figure 3:
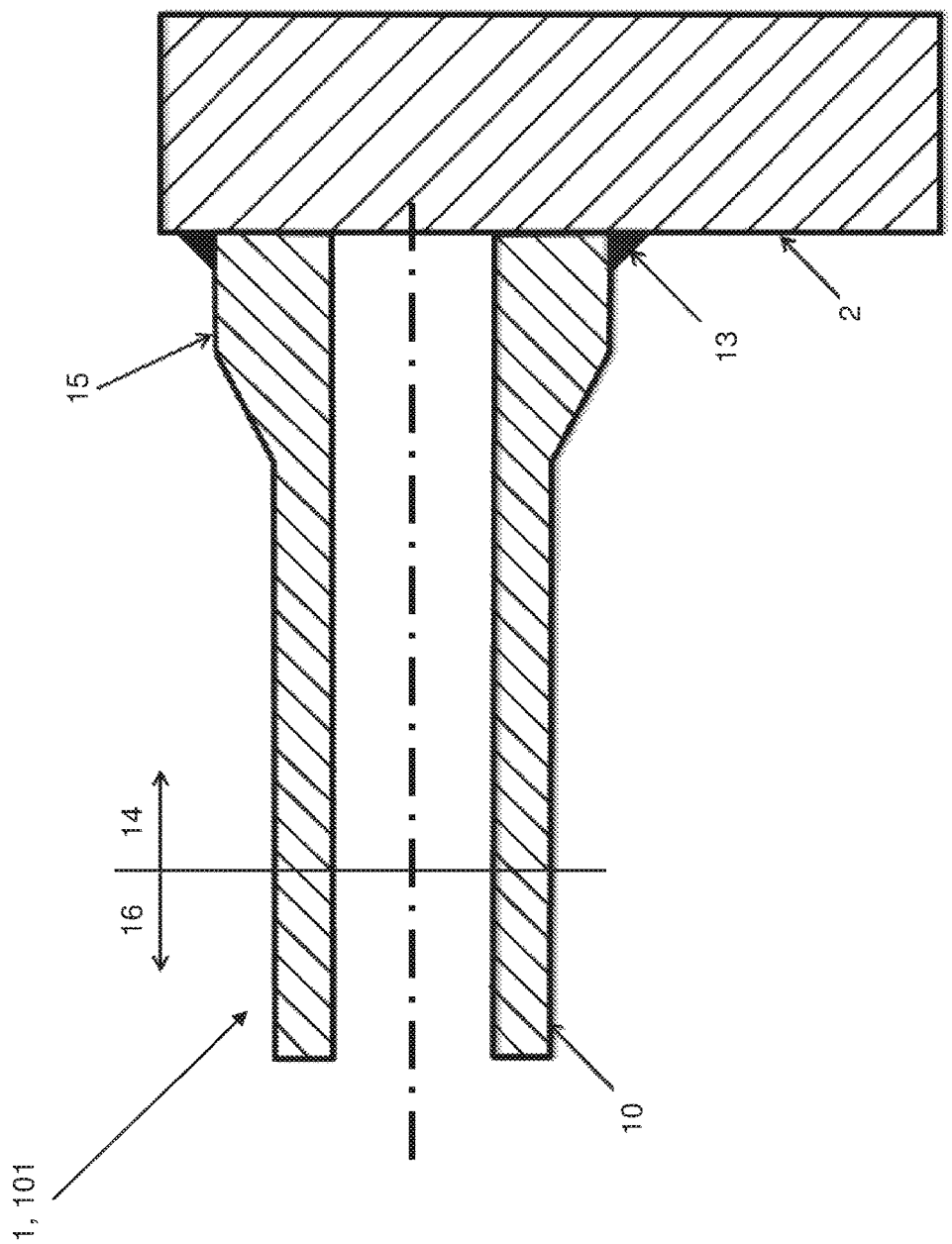
FIG. 3 shows a schematic detailed view of the connecting point of the embodiment of the chassis component according to FIG. 2.

In FIG. 2 a further embodiment of a chassis component 1 is shown. In this embodiment the chassis component 1 is a stabilizer 101. In the depicted embodiment the stabilizer 101 comprises a tubular element 10, the ends of which are each attached to a connecting component 2. In the depicted embodiment the tubular element 10 has hot formed areas 15 at its longitudinal ends, which have a larger diameter than the outer diameter of the tubular element 10. The longitudinal ends may be for example hot-upset. As can be derived from FIG. 3, the longitudinal ends are attached to the connecting component 2 by a welding seam 13. In addition, in FIG. 3 an area is shown which is affected by the hot-forming of the longitudinal ends of the tubular element 10 and thereby forms the heat-affected zone 14. The area which lies between the heat-affected zones 14 and which is also referred to as a further length section 16, is preferably present in the normalized or air-hardened condition.

FIG. 4 shows an embodiment of a chassis component 1. The chassis component 1 in FIG. 4 is a track rod 102. The track rod comprises a tubular element 10 which is preferably a seamless tubular element 10. At both ends of the tubular element 10 a track rod end 17 is provided. The track rod end 17 is connected to the tubular element 10 by inserting a peg 18 into the end of the tubular element 10. The peg 18 may be welded to the tubular element 10.

In FIG. 5 a further embodiment of the chassis component 1 is shown. In this embodiment the chassis component 1 is also a track rod 102. The only difference to the embodiment shown in FIG. 4 is that the pegs 18 are attached to the tubular element 10 by inserting the peg 18 into a widened or otherwise hot-formed end 15 of the tubular element 10. In this case the pegs 18 may be attached by pressing the ends of the tubular element 10 or by welding the track rod end 102 to the tubular element 10, in particular to its end.

In both embodiments shown in FIGS. 4 and 5, the longitudinal ends of the tubular element 10 are subjected to a forming or joining process of thermal nature, so that at the ends of the tubular element 10 heat-affected zones 14 are generated. The heat-affected zone 14 is adjacent to the further length section 16.

REFERENCE NUMBERS 1 component
10 tubular element
11 tapered area
12 toothed shaft end
13 welding seam
14 heat-affected zone
15 hot formed area
16 further length section
17 track rod end
18 peg
100 drive shaft
101 stabilizer
102 track rod
2 connecting component

What is claimed is:

1. Chassis or drive component for a motor vehicle, comprising a tubular element (10) with at least one heat-affected zone (14), characterized by a yield strength $Rp_{0.2}$ in the heat-affected zone (14) of at least 640 MPa and a tensile strength Rm in the heat-affected zone of at least 850 MPa, wherein the tubular element (10) consists of a steel alloy consisting of, in weight percent:

| | |
|---|---|
| C | 0.12-0.22% |
| Mn | 1.5-2.5% |
| Si | 0.45-0.85% |
| Cr | maximum 1.5% |
| V | ≥0.04% |
| B | 0.0010-0.0040% |
| Ti | 0.02-0.1% and |
| optionally Mo | ≤0.6%, | balance iron and impurities resulting from smelting.

2. Chassis or drive component according to claim 1, wherein the at least one heat-affected zone (14) has a tempered structure of tempered bainite and/or tempered martensite.

3. Chassis or drive component according to claim 1, wherein the chassis is selected from the group consisting of a stabilizer (101) and a track rod (102).

4. Chassis or drive component according to claim 1, wherein the chassis or drive component (1) apart from the at least one heat-affected zone (14) comprises a further length section (16), wherein the further length section (16) has a normalized or air-hardened structure, wherein the further length section (16) has a tensile strength Rm of >1,050 MPa.

5. Chassis or drive component according to claim 1, wherein the tubular element (10) has a length, and further wherein the heat-affected zone (14) has a length which is less than 15 percent of the length of the tubular element (10) of the chassis or drive component.

6. Chassis or drive component according to claim 1, wherein the carbon content is in the range of 0.15-0.20%.

7. Chassis or drive component according to claim 1, wherein the chromium content is in the range of 0.5-1.5%.

8. Chassis or drive component according to claim 1, wherein the molybdenum content is in the range of 0.1-0.2%.

9. Chassis or drive component according to claim 1, wherein the vanadium content is in the range of 0.04-0.15%.

10. Chassis or drive component according to claim 1, wherein the steel alloy consists, given in weight percent, of:

| | |
|---|---|
| C | 0.17-0.20% |
| Mn | 1.7-2.2% |
| Si | 0.5-0.7% |
| Cr | 0.6-1.4% |
| V | 0.05-0.10% |
| B | 0.0010-0.0030% |
| Ti | 0.03-0.08% |
| Mo | 0.1-0.2% | balance iron and impurities resulting from smelting.

11. Chassis or drive component according to claim 1, wherein the heat-affected zone is generated by subjecting at least the ends of the tubular element (10) to a temperature of 600° C. for at least 5 minutes.

12. Chassis or drive component according to claim 1, wherein the tubular element (10) has a length, and further wherein the heat-affected zone (14) has a length which is less than 10 percent of the length of the tubular element (10) of the chassis or drive component.

13. Chassis or drive component according to claim 1, wherein the heat-affected zone is generated by subjecting at least the ends of the tubular element (10) to a temperature of 600° C. for at least 15 minutes.

14. Chassis or drive component according to claim 1, wherein the drive component is a drive shaft (100).

* * * * *